No. 652,851. Patented July 3, 1900.
H. W. LIBBEY.
AUTOMOBILE VEHICLE.
(Application filed Oct. 2, 1899.)
(No Model.)
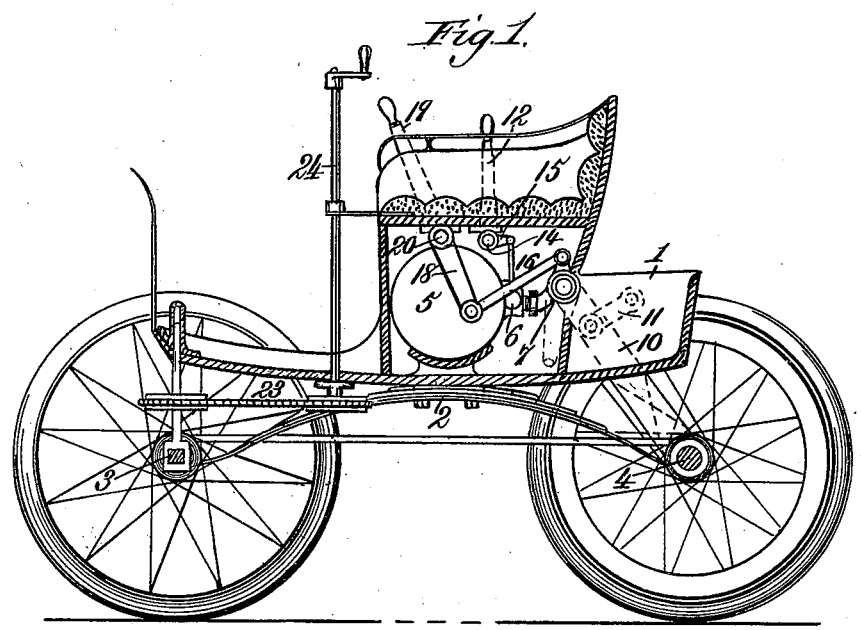
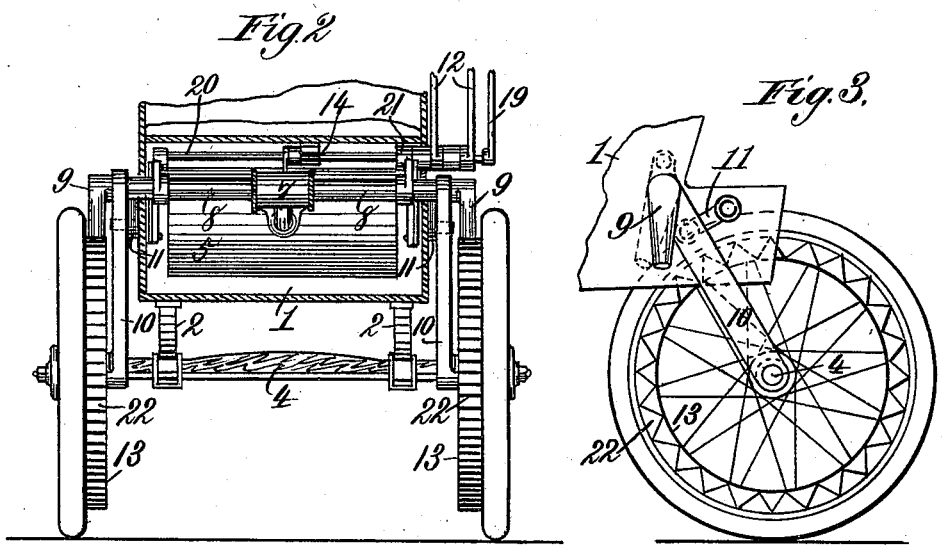
WITNESSES:
INVENTOR.
Hosea W. Libbey,
BY James L. Norris
ATTORNEY.

UNITED STATES PATENT OFFICE.

HOSEA W. LIBBEY, OF BOSTON, MASSACHUSETTS.

AUTOMOBILE VEHICLE.

SPECIFICATION forming part of Letters Patent No. 652,851, dated July 3, 1900.

Application filed October 2, 1899. Serial No. 732,402. (No model.)

*To all whom it may concern:*

Be it known that I, HOSEA W. LIBBEY, a citizen of the United States, residing at Boston, in the county of Suffolk and State of Massachusetts, have invented new and useful Improvements in Automobile Vehicles, of which the following is a specification.

My invention relates to automobile vehicles to be propelled by the force of compressed or liquefied air or gas contained in the storage-reservoir carried by the vehicle, with provisions for discharging a jet or jets of the compressed fluid against the buckets or vanes of a motor wheel or wheels mounted on the vehicle.

It is the object of this invention to provide, among other things, an adjustment for the discharge nozzle or nozzles, so as to cause the vehicle to be propelled either forward or backward and also to serve as a brake, if necessary.

The invention consists in features of construction and novel combinations of parts in an automobile vehicle, as hereinafter more particularly described and claimed.

In the annexed drawings, Figure 1 is a sectional side elevation of my invention as applied to a Concord wagon. Fig. 2 is a rear elevation of the same. Fig. 3 is a detail view of the rear axle, a rear wheel of the vehicle with motor-wheel attached thereto, and showing also the manner of mounting a hinged nozzle or nozzles on the rear axle.

The reference-numeral 1 designates the vehicle-body, mounted on side springs 2, that are supported from the front axle 3 and rear axle 4 in any convenient manner.

Beneath the carriage-seat or in any other convenient location there is placed a storage-reservoir 5 for compressed or liquefied air or gas. As shown in Fig. 1, a reducing-valve 6 is arranged at the rear of the storage-reservoir 5 and in communication therewith. This reducing-valve 6 communicates with a distributing-chamber 7 in the form of a T-coupling. In the ends of this distributing-chamber 7 are inserted the inner ends of rotatable conduits 8, carrying depending nozzles 9 on their outer ends. These conduits 8 are supported at their outer ends by links 10, which are pivotally attached at their lower ends to the rear axle. Near its upper end each link 10 is further supported by a short link 11, pivotally attached to the vehicle-body.

A hand-lever 12 is located within easy reach of the driver for the purpose of operating the valve 6 to control the discharge of compressed or liquefied air or gas through the nozzles 9 against the buckets or vanes of motor-wheels 13, that are preferably attached to the inner sides of the rims of the rear vehicle-wheels. The hand-lever 12 is on one end of a transversely-arranged shaft 14, having on its other end a crank-arm 15, with which the valve-rod 16 is connected. The rotatable conduits 8 are independently connected through suitable links 17 and 18 with hand-levers 19 for controlling the position of the nozzles 9 by imparting a suitable oscillatory movement to either or both of said conduits, as required, according to the direction in which the vehicle is to be propelled. One of the levers 19 is attached directly to a transversely-arranged shaft 20, with which one pair of links 17 and 18 connect, and the other hand-lever connects with a sleeve 21, with which the other pair of links 17 and 18 connect. The two hand-levers 19 are located so close together that they may be both grasped at once, and so the two swinging nozzles 9 can be conveniently operated together or independently of each other, as may be required. It will be observed that by mounting the nozzles 9 in the manner described each nozzle, in effect, constitutes a hinged or adjustable device for directing a jet of compressed or liquefied air or gas against the buckets or vanes of the adjacent motor-wheel in proper direction to propel the vehicle either forward or backward, as desired. By directing the nozzles 9 downward, as shown by full lines in Fig. 3, the vehicle will be propelled forward, and by turning these nozzles to a rearward inclined position the jet or jets issuing therefrom will be caused to act as a brake against the motor-wheel or will serve to propel the vehicle rearward. In turning corners one nozzle may be adjusted in position to retard the revolution of one of the wheels, as required. These functions of the swinging nozzles 9 in propelling the vehicle either forward or backward or in serving as a brake will be facilitated by a symmetrical construction and arrangement of the vanes or blades constituting the buckets 22 of the motor-wheel, as shown in Fig. 3, the full force of the jet being thus imparted to the motor-wheel in revolving it either forward or rearward.

As shown, the vehicle-wheels may be of the well-known pneumatic-tire type, and in this construction of vehicle-wheel it is preferable to attach the bucketed motor-wheels to the inner sides of the vehicle-wheel rims.

By opening the valve 6 to a suitable extent through its operating-lever 12 the vehicle may be propelled at any desired speed, and by adjusting the swinging nozzles 9, either independently or together, through their lever connections a suitable braking action can be applied whenever required, and the vehicle may be made to turn corners with great ease and convenience.

A steering-gear 23 is provided and may be controlled by the usual vertically-arranged cranked shaft 24, as shown.

I may employ in the storage-reservoir 5 liquefied air or gas or ordinary compressed air or gas, as most convenient, and the reservoir may be charged as required from any convenient source of supply.

The motor mechanism described may be applied to any vehicle by adding the two rear motor-wheels, the reservoir, piping, nozzles, and operating-levers and by providing any suitable steering mechanism. The motor-wheels are preferably made an integral part of the vehicle-wheel and are provided with blades of symmetrical shape to be acted upon in either direction by a jet of compressed or liquefied air or gas. The swinging nozzles 9 deliver a full stream of gas or air under pressure within the range of motion in which the jet strikes the motor vanes, blades, or buckets; but if the nozzles are adjusted or thrown outside of this line in either direction a port in the distributing-chamber is closed, consequently cutting off the delivery of pressure to the nozzle independently of any operation of the main valve, thus providing for shutting off the power quickly. By means of the swinging jet-nozzles both wheels may be driven together or they may be driven separately either forward or backward, and the speed of the two wheels may be varied when turning corners. Also the jet from either nozzle may be utilized as a brake by a partial reversal of the nozzle.

If desired, the storage-reservoirs and the several pipes and passages for compressed or liquefied air or gas may be provided with a non-conducting covering, preferably composed of an inner layer of asbestos and an outer layer of rubber or rubber fabric, the asbestos being designed to protect the contents of said reservoirs and passages from the warmth of the outside atmosphere and the rubber to afford a protection against dampness.

What I claim as my invention is—

1. In an automobile vehicle, the combination of motor-wheels attached to the inner sides of the rims of the rear vehicle-wheels and each provided with buckets, blades or vanes, having symmetrical sides, a storage-reservoir for compressed or liquefied air or gas, carried by the vehicle, a distributing-chamber having rotatable conduits projecting laterally in opposite directions from the ends of said chamber, nozzles connected with the outer ends of said conduits to direct jets of compressed or liquefied air or gas against the buckets of the motor-wheels, a reducing-valve intermediate said storage-reservoir and said distributing-chamber and adapted to communicate with each, lever mechanism for operating said valve, and independent lever mechanism for each conduit and its nozzle, whereby said nozzles may be swung into position separately or together.

2. In an automobile vehicle, the combination with a storage-reservoir for compressed or liquefied air or gas, carried on said vehicle, motor-wheels attached to the inner sides of the rims of the vehicle-wheels and each having its periphery provided with buckets having symmetrical sides, a distributing-chamber having rotatable conduits projecting laterally from its opposite ends, nozzles connected with the outer ends of said conduits and depending therefrom to direct jets of compressed or liquefied air or gas against the buckets of the motor-wheels, links pivotally mounted on the rear axle and extending upwardly and forwardly therefrom to support said conduits, a reducing-valve intermediate the storage-reservoir and distributing-chamber and adapted to communicate with each, lever mechanism for operating said valve, and independent lever mechanism for each conduit and its nozzle, whereby said nozzles may be adjusted separately or together to discharge a jet or jets against the motor-wheels in a direction to propel the same forwardly or rearwardly, substantially as described.

3. In an automobile vehicle, the combination of motor-wheels attached to the inner sides of the rims of the rear vehicle-wheels and each provided with buckets, blades or vanes, links pivotally mounted on the rear axle and extended upwardly and forwardly therefrom, means for suspending the upper ends of said links, rotatable conduits supported by the upper ends of said links, nozzles connected with the outer ends of said conduits to direct jets of compressed or liquefied air or gas against the buckets of the motor-wheels, a distributing-chamber connected with the inner ends of said conduits, a storage-reservoir for compressed or liquefied air or gas mounted on the vehicle, a reducing-valve intermediate said storage-reservoir and said distributing-chamber and adapted to communicate with each, lever mechanism for operating said valve, and independent lever mechanism for each conduit and its nozzle, whereby said nozzles may be swung into position, separately or together, to direct a jet or jets against the motor-wheels in a direction to propel the same forwardly or rearwardly, substantially as described.

4. In an automobile vehicle, the combination of a storage-reservoir for compressed or liquefied air or gas carried on said vehicle, a reducing-valve adapted to communicate with said reservoir to control the discharge therefrom, lever mechanism for operating said valve, a distributing-chamber in communication with said valve, rotatable conduits connected with the ends of said chamber and extended therefrom in lateral directions, nozzles on the outer ends of said conduits, motor-wheels attached to the inner sides of the rims of the rear vehicle-wheels and provided with buckets, links pivotally mounted on the rear axle and extended forwardly and upwardly therefrom to support the rotatable conduits, independent lever mechanism for each conduit whereby the said conduits and their attached nozzles can be adjusted into position, either independently or together, to direct jets of compressed or liquefied air or gas against the buckets of the motor-wheels to propel the same either forwardly or rearwardly and to serve as a brake, and steering mechanism for said vehicle, substantially as described.

5. In an automobile vehicle, the combination with the vehicle-body, forward and rear axles, and springs supported on said axles and on which the vehicle-body is mounted, of a storage-reservoir for compressed or liquefied air or gas mounted on the vehicle-body, motor-wheels attached to the inner sides of the rims of the rear vehicle-wheels and provided with buckets, swinging nozzles to direct jets of compressed air or gas against the buckets of said motor-wheels, rotatable conduits with which said nozzles are connected, a distributing-chamber intermediate the ends of said conduits, links pivotally mounted on the rear axle and extended upwardly and forwardly therefrom to support the rotatable conduits, and short links connecting the upper portions of said conduit-supporting links with the vehicle-body, lever mechanism for rotating the conduits and their nozzles, independently or together, a reducing-valve intermediate the reservoir and the distributing-chamber, lever mechanism for operating said valve, and steering mechanism, substantially as described.

In testimony whereof I have hereunto set my hand in presence of two subscribing witnesses.

HOSEA W. LIBBEY.

Witnesses:
  CHAS. STEERE,
  WINIFRED G. KERWIN.